United States Patent
Ranka et al.

(10) Patent No.: US 6,807,001 B1
(45) Date of Patent: Oct. 19, 2004

(54) AUTO SHUTDOWN FOR DISTRIBUTED RAMAN AMPLIFIERS ON OPTICAL COMMUNICATION SYSTEMS

(75) Inventors: Jinendra Kumar Ranka, Lowell, MA (US); Jeffrey David Christoph, Portsmouth, NH (US); Erie Anthony Kilpatrick, Marlborough, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 80 days.

(21) Appl. No.: 10/118,982

(22) Filed: Apr. 9, 2002

Related U.S. Application Data

(60) Provisional application No. 60/284,737, filed on Apr. 17, 2001.

(51) Int. Cl.[7] ................................. H01S 3/00
(52) U.S. Cl. .................. 359/341.3; 359/334; 398/15
(58) Field of Search .................. 359/341.1, 334; 398/15

(56) References Cited

U.S. PATENT DOCUMENTS

| | | | | |
|---|---|---|---|---|
| 5,343,286 A | * | 8/1994 | Keeble et al. ............. 356/73.1 |
| 5,966,206 A | * | 10/1999 | Jander ....................... 356/73.1 |
| 6,373,621 B1 | * | 4/2002 | Large et al. ................ 359/334 |
| 6,423,963 B1 | * | 7/2002 | Wu ........................ 250/227.14 |
| 6,433,922 B1 | * | 8/2002 | Ghera et al. ................ 359/334 |
| 6,441,951 B1 | * | 8/2002 | Tanaka et al. .............. 359/334 |
| 6,452,716 B1 | * | 9/2002 | Park et al. .................. 359/334 |
| 6,532,102 B2 | * | 3/2003 | Kobayashi et al. ......... 359/334 |
| 6,547,453 B1 | * | 4/2003 | Stummer et al. ............. 385/88 |

* cited by examiner

Primary Examiner—Nelson Moskowitz
Assistant Examiner—Deandra M. Hughes
(74) Attorney, Agent, or Firm—Daly, Crowley & Mofford, LLP

(57) ABSTRACT

A method and apparatus for detecting if an optical module has been disconnected from a fiber span or if there has been a break in the span, and for automatically reducing the output signal level of the optical module such that the output signal level is within an acceptable safety limit. Also disclosed is a system and technique for automatically resetting a Raman pump unit once the source of an optical leak has been located and addressed.

5 Claims, 2 Drawing Sheets

AUTO SHUTDOWN FOR DISTRIBUTED RAMAN AMPLIFIERS ON OPTICAL COMMUNICATION SYSTEMS

CROSS-REFERENCE TO RELATED APPLICATIONS

This application claims the benefit of U.S. Provisional Application No. 60/284,737, filed on Apr. 17, 2001 which application is hereby incorporated herein by reference in its entirety.

STATEMENTS REGARDING FEDERALLY SPONSORED RESEARCH

Not applicable.

1. Field of the Invention

This invention relates generally to optical amplifiers and more particularly to a system and method for auto-shutdown of distributed Raman amplifiers in optical communications systems 2. Background of the Invention As is known in the art, distributed Raman amplifiers in optical communications systems function by injecting a high-power optical beam into the transmission fiber. Energy is transferred from the Raman pump laser to the signals as they propagate in the fiber. Stimulated Raman scattering is an intensity dependent process, hence the optical power requirement of the Raman pump laser increases as the optical gain and bandwidth of the amplifier are increased.

The Raman pump laser is injected into the transmission fiber and the communication system is considered as a closed system such that during normal operation there is no risk of human exposure to dangerous optical power levels. However, there can exist a significant safety hazard and risk of exposure to high optical powers from the amplifier if there is a break in the transmission fiber or the Raman pump laser is disconnected from the transmission fiber while the unit is active.

In order to meet US and European safety regulations, as well as to significantly reduce any exposure risk, it would be desirable if it was possible to detect if amplifier was disconnected from the fiber span or if there was a break in the span, and automatically reduce it's output power level to an acceptable safety limit.

It would, therefore, be desirable to provide a system and technique for detecting if an optical module has been disconnected from a fiber span or if there has been a break in the span, and for automatically reducing the output signal level of optical module such that the output signal level is within an acceptable safety limit.

It would also be desirable to provide a system and technique for automatically resetting a Raman pump unit once the source of the optical leak has been located and addressed.

SUMMARY OF THE INVENTION

In accordance with the present invention, a technique for detecting if an optical module has been disconnected from the fiber span or if there has been a break in the span, and for automatically reducing the output of an amplifier such that the output is within an acceptable safety limit is provided.

In one embodiment, for a counter-propagating distributed Raman amplifier, where the signals and Raman pumps are travelling in opposite several criteria can be used. For an amplifier providing gain to the C- and L signal bands, the a break in the transmission line can be detected by: (1) a loss of signals in both the C-band and L-band or (2) a high amount of Raman pump light backreflected in the Raman pump module.

The loss of signal can be determined by measuring the optical power as tapped from the main transmission path. It is preferred that the C and L-bands first be demultiplexed before detecting the signal power. A loss of signal in a given band would be determined if the signal power level falls below a set minimal threshold level. To determine a break anywhere in the fiber span, this level should be set at a power above the Raman generated ASE at measured at the Raman pump module Lower power levels will restrict the detection of a fiber break to a limited section of the transmission span. This may be acceptable, as this will allow monitoring of a portion of the fiber span where the Raman pump power is greatest.

The high backreflection criteria is based on the fact that when the Raman pump module is disconnected from the transmission span, ~4% of the pump light will be reflected back into the module if a flat polished connector is used When the module is connected to the span, typically less than 0.2% of the light is backreflected into the module due to Rayleigh scattering in the fiber. The power threshold level for shutdown should be set between 4% and 0.5% of the nominal operating Raman pump power level.

If either criteria 1 or 2 is detected, the module should automatically turn off in a time period short enough such that the maximum permitted optical exposure does not exceed ANSI safety limits.

If the Raman pump unit is on and there is any detectable signal power in either the C-band, L-band, or the supervisory channel, the Raman pump unit should override the shutdown circuitry and reset to the operating power level for a time period not to exceed the maximum permitted exposure. At the end of the time period, the shutdown circuitry should be re-enabled.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
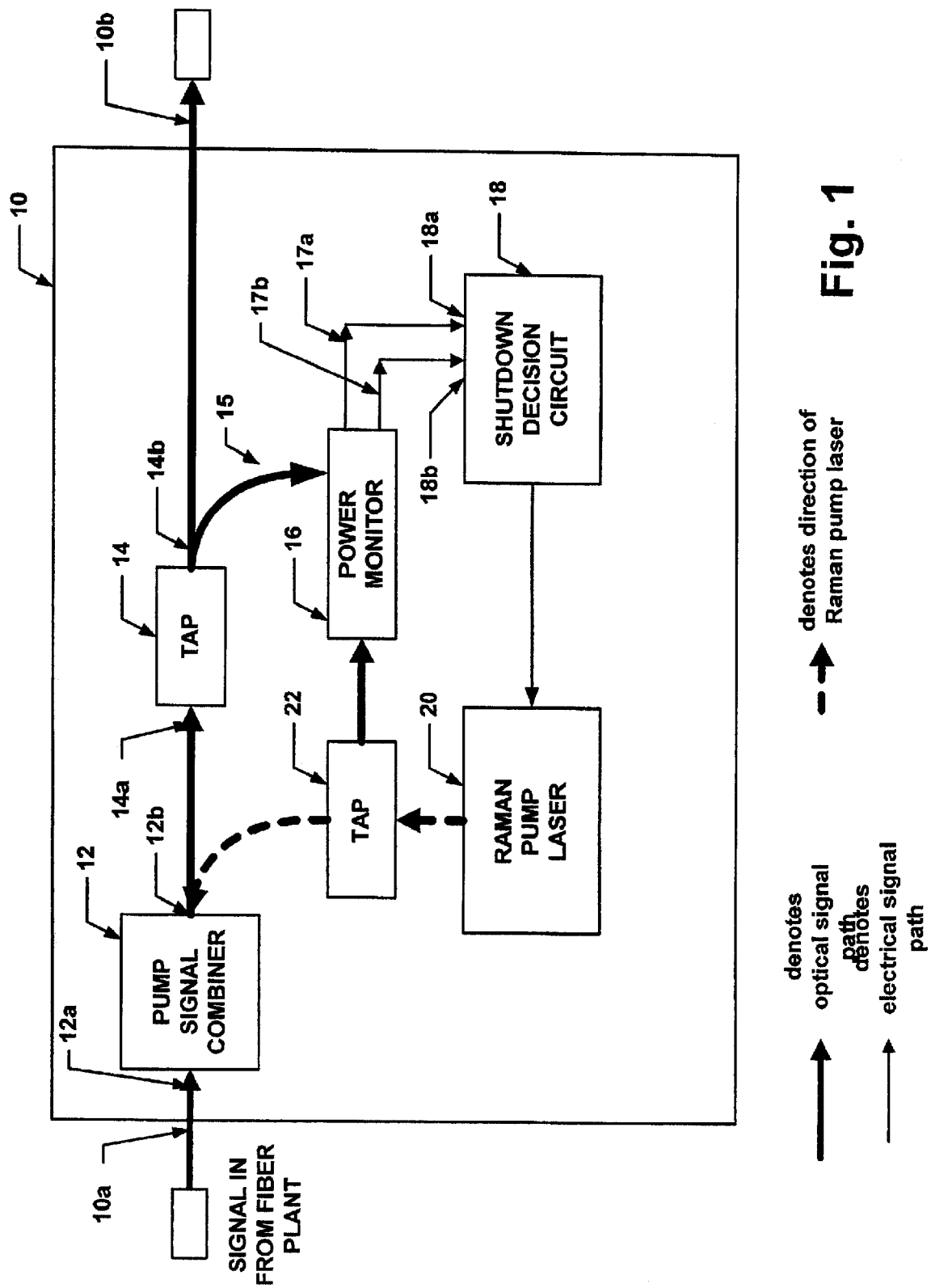
FIG. 1 is a block diagram of an optical amplifier module.

Referring now to FIG. 1, an amplifier 10 having an input 10*a* and an output 10*b* includes a pump signal combiner 12 having a first port 12*a* coupled to the amplifier input 10*a* and a second port 12*b* coupled to a tap 14 at a first input 14*a*. A tap output 14*b* is coupled to the amplifier output 10*b*. The combiner 12 is a wavelength selective combiner as is generally known.

Tap 14*b* couples a portion of the optical signal along an optical path 15 to a power monitor 16 at a first input 16*a*. Power monitor 16 measures the optical signal portion provided thereto and provides a control signal along a control signal path 17a to an input 18a of a shutdown decision circuit 18. In one exemplary embodiment, the control signal corresponds to an electrical signal.

The shutdown decision circuit 18 is coupled to a control terminal of a pump laser 20. An output of the pump laser 20 is coupled through a second tap 22 to the pump-signal combiner 12 such that the Raman pump laser signal is injected into the transmission fiber as is generally known to produce an output signal having a relatively high power level at the optical module output port 10b.

In response to the signal level of the portion of the optical signal coupled via tap 14 to the power monitor 16 being less than a first reference signal level, the control signal provided to the decision circuit 18 has a first signal characteristic. In response to the signal level of the portion of the optical signal coupled via tap 14 to the power monitor 16 being greater than the first reference signal level, the control signal provided to the decision circuit 18 has a second signal characteristic which is different than the first signal characteristic.

In response to the decision circuit 18 receiving the control signal having the first signal characteristic, the decision circuit 18 provides a control signal to the Raman pump laser 20 which stops the operation of the Raman pump laser 20 In response to the decision circuit 18 receiving the control signal having the second signal characteristic, the decision circuit 18 provides a control signal to the Raman pump laser 20 which maintains the operation of the Raman pump laser 20.

Tap 22 is disposed such that a portion of any signal of appropriate wavelength reflected back toward the Raman pump laser is coupled via tap 14 to the power monitor 16. If the signal level is less than a second reference signal level, the control signal provided to the decision circuit 18 along path 17b has a first signal characteristic. In response to the signal level of the portion of the optical signal coupled via tap 22 to the power monitor 16 being greater than the second reference signal level, the control signal provided to the decision circuit 18 has a second signal characteristic which is different than the first signal characteristic.

In response to the signal level of the portion of the optical signal coupled via tap 22 to the power monitor 16 being less than a first reference signal level, the control signal provided to the decision circuit 18 has a first signal characteristic In response to the signal level of the portion of the optical signal coupled via tap 14 to the power monitor 16 being greater than the first reference signal level, the control signal provided to the decision circuit 18 has a second signal characteristic which is different than the first signal characteristic.

In response to the decision circuit 18 receiving the control signal having the first signal characteristic, the decision circuit 18 provides a control signal to the Raman pump laser 20 which stops the operation of the Raman pump laser 20. In response to the decision circuit 18 receiving the control signal having the second signal characteristic, the decision circuit 18 provides a control signal to the Raman pump laser 20 which maintains the operation of the Raman pump laser 20.

Typically the fiber plant (which is underground) produces signals which are provided to the input 10a of the optical module 10 and which preferably propagate to the optical module output port 10b. The optical module includes a tap 14 which couples to the power monitor 16 a relatively small portion of the signal propagating to the optical module output port 10b.

The Raman pump laser 20 provides a pump signal having a wavelength different than the wavelength of the signals provided by the fiber plant and as is generally known, the Raman pump laser injects the pump signal into the fiber plant in a direction which is opposite to the direction of the signal provided by the fiber plant. As shown in FIG. 1, the pump signal provided by the Raman pump laser 20 is coupled through the tap 22 and the pump-signal combiner 12 to the fiber plant. The pump signal combiner 12 combines the pump signal with the fiber plant signal to produce an amplified signal at the optical module output port 10b.

In operation, the circuit operates to detect a break in the fiber as follows. Assuming that there is a break in the fiber 11, then the fiber 11 will have a reflection characteristic Thus, in this case, the pump signal provided by the Raman pump laser 20 is coupled through the tap 22 and the pump-signal combiner 12 until the pump signal reaches the discontinuity caused by the break in the fiber 11. At this point, at least a portion of the Raman pump signal is reflected off the discontinuity back through the combiner 12 and toward the Raman pump laser 20.

The tap 22 thus couples a portion of the back-reflected signal to the power monitor 16. The power monitor 16 then measures the back-reflected signal and compares the signal level of the back-reflected signal to a reference signal level.

Figure 2:
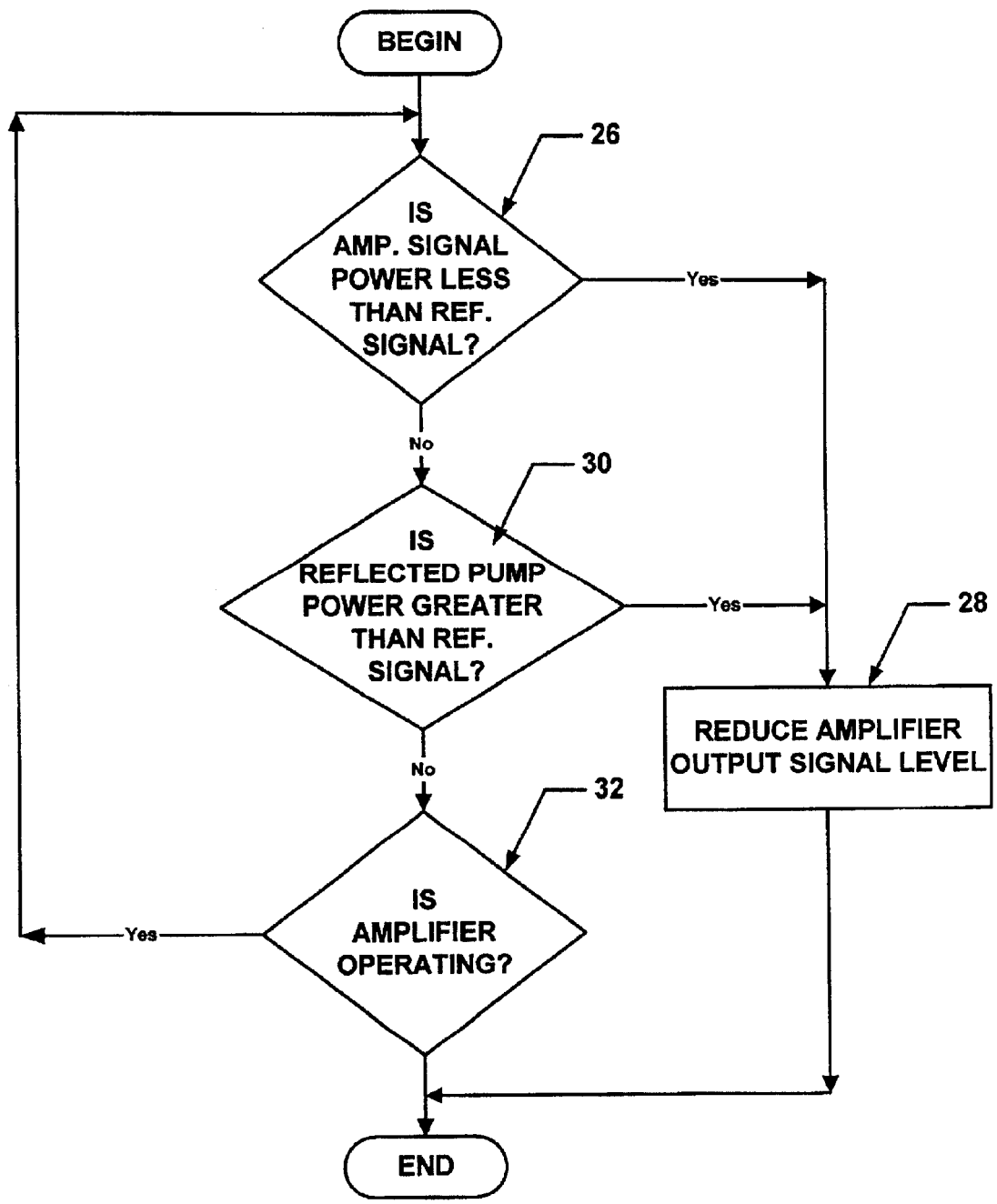
FIG. 2 is a flow diagram of a process for detecting if an optical module has been disconnected from a fiber span or if there has been a break in the span, and for automatically reducing the output signal level of the optical module such that the output signal level is within an acceptable safety limit.

FIG. 2 is a flow diagram showing the processing performed by portions of system 10 (FIG. 1) to detect unsafe operating conditions and to automatically reduce amplifier output power to power levels within acceptable safety limits. This can include of course automatically stopping operation of the amplifier. The rectangular elements (typified by element 26 in FIG. 2), are herein denoted "processing blocks" and represent computer software instructions or groups of instructions. The diamond shaped elements (typified by element 38 in FIG. 2), are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required to perform backup and restore operations in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order Turning now to FIG. 2, the process of detecting unsafe operating conditions and to automatically reduce amplifier output power to power levels within acceptable safety limits begins by comparing a reference signal to an amplifier output signal as shown in decision block 26. If the amplifier signal level is less than the reference signal level, then processing proceeds to step 28 in which the amplifier output signal is reduced such that it is within acceptable safety limits. In one embodiment, the amplifier output may be reduced by shutting down a Raman pump module. The pump module should be shut down quickly enough to prevent any harmful effects.

If the amplifier signal level is not greater than the reference signal level, then processing proceeds to decision block step 30 in which a reflected power signal level is compared to a reference signal level. If the reflected power signal level is greater than the reference signal level, then processing again proceeds to step 28 in which the amplifier output signal is reduced such that it is within acceptable safety limits. If the amplifier signal level is not greater than the reference signal level, then processing proceeds to decision block 32 in which a determination is made as to whether the amplifier is operating. If the amplifier is operating, then processing returns to decision block 26 and steps 26–32 are repeated. If the amplifier is not operating, processing then ends.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. An optical module having an input port and an output port, the optical module comprising:
    a pump-signal combiner, having a first port coupled to the input of the optical module and having a second port;
    a first tap having a first port coupled to the output of the optical module, having a second port coupled to the output of the optical module and having a third port;
    a power monitor having a first port coupled to the second port of the first tap and having a second port;
    a shutdown circuit having a first port coupled to the second port of said power monitor and having a second port; and
    a pump laser circuit, having a first port coupled to the second port of said shutdown circuit and having a second port coupled to the second port of said pump-signal combiner.

2. The optical module of claim 1 wherein said power monitor has a third port and said optical module further comprises a second tap, having a first port coupled to the output of said pump laser, having a second port coupled to the output of said pump-signal combiner and having a third port coupled to the third port of said power monitor.

3. An optical module having an input port and an output port, the optical module comprising;
    a pump-signal combiner, having a first port coupled to the input of the optical module and having a second port;
    a power output reduction circuit having a first port coupled to said pump signal combiner and a second port coupled to the output of the optical module such that in response to said power output reduction circuit detecting an output signal level which poses a risk of human exposure to dangerous optical power levels, said power output reduction circuit reduces the output signal level at the output of the optical module and wherein said power output reduction circuit further comprises:
    a first tap having a first port coupled to the output of said pump signal combiner, a second port coupled to the output of the optical module, and having a third port;
    a power monitor having a first port coupled to the second port of the first tap and having a second port;
    a shutdown decision circuit having a first port coupled to the second port of said power monitor and having a second port; and
    a pump laser circuit having a first port coupled to the second port of said shutdown decision circuit and having a second port coupled to the pump signal combiner.

4. The optical module of claim 3 wherein said power output reduction circuit comprises:
    a first tap having a first port coupled to the output of said pump signal combiner, a second port coupled to the output of the optical module, and having a third port;
    a power monitor having a first port coupled to the third port of the first tap and having a control terminal;
    a switch having a control terminal coupled to the control terminal of said power monitor, a first port coupled to the second port of said tap, a second port coupled to the output of the amplifier and a third poll; and
    a confined signal path having a first port coupled to the third port of said switch wherein in response to said power monitor detecting an output signal level which poses a risk of human exposure to dangerous optical power levels, said switch provides a connection between the first switch port and the third switch port to reduce the output signal level at the output of the optical module.

5. The optical module of claim 4 wherein said confined signal has an energy absorbing termination coupled thereto.

* * * * *

UNITED STATES PATENT AND TRADEMARK OFFICE
CERTIFICATE OF CORRECTION

PATENT NO. : 6,807,001 B1
DATED : October 19, 2004
INVENTOR(S) : Ranka et al.

It is certified that error appears in the above-identified patent and that said Letters Patent is hereby corrected as shown below:

Column 1,
Line 44, delete "it's" and replace with -- its --.

Column 2,
Lines 1-2, delete "a break" and replace with -- break --.
Line 13, delete "at measured" and replace with -- as measured --.
Line 14, delete "module lower" and replace with -- module. Lower --.
Lines 22-23, delete "used when" and replace with -- used. When --.

Column 3,
Line 24, delete "20 In" and replace with -- 20. In --.

Column 4,
Lines 14-15, delete "characteristic thus," and replace with -- characteristic. Thus, --.
Line 57, delete "stated the" and replace with -- stated, the --.

Column 6,
Line 40, delete "third poll;" and replace with -- third port; --.

Signed and Sealed this

Seventh Day of February, 2006

JON W. DUDAS
*Director of the United States Patent and Trademark Office*